United States Patent [19]
Lynn et al.

[11] Patent Number: 5,388,149
[45] Date of Patent: Feb. 7, 1995

[54] METHOD AND APPARATUS FOR DETERMINING AVAILABILITY OF A PUBLIC BASE UNIT FOR COMMUNICATING WITH A CORDLESS TELEPHONE IN A PUBLIC CORDLESS TELEPHONE SYSTEM

[75] Inventors: Dale E. Lynn, Freehold; Edwin A. Muth, Matawan, both of N.J.

[73] Assignee: AT&T Corp., Murray Hill, N.J.

[21] Appl. No.: 712,177

[22] Filed: Jun. 3, 1991

[51] Int. Cl.[6] .................................................. H04N 11/00
[52] U.S. Cl. ......................................... 379/61; 379/63
[58] Field of Search ...................... 379/58, 61, 62, 63; 455/32.1, 32.2

[56] References Cited

U.S. PATENT DOCUMENTS

| | | | |
|---|---|---|---|
| 4,639,549 | 1/1987 | Hirayama et al. | 379/62 |
| 4,679,225 | 7/1987 | Higashiyama | 379/62 |
| 4,694,485 | 9/1987 | Iwase | 379/61 |
| 4,768,218 | 8/1988 | Yorita | 379/63 X |
| 4,768,219 | 8/1988 | Yamagata et al. | 379/61 |
| 4,878,239 | 10/1989 | Rash et al. | 379/58 |
| 4,882,766 | 11/1989 | Akaiwa | 379/62 |
| 4,953,198 | 8/1990 | Daly et al. | 379/61 |
| 5,040,205 | 7/1991 | Kunihiro | 379/61 |
| 5,044,010 | 7/1991 | Frenkiel et al. | 379/61 |

*Primary Examiner*—Stephen Chin
*Assistant Examiner*—Paul Loomis
*Attorney, Agent, or Firm*—Samuel R. Williamson

[57] ABSTRACT

A public cordless telephone system includes an arrangement for informing a public handset unit when it is within the reception range of a public base unit even though all communication channels are then occupied or all public base units in the reception area are then busy communicating with other handset units. In operation, each public base unit while communicating with any public handset unit inserts in the communication channel it is then occupying spectrum energy such as is provided either by a pilot signal or a frequency shift keying (FSK) signal. By providing this additional spectrum energy along with normal voice signal energy in the communication channel, a public handset unit while searching for an available channel and interrogating this channel will be able to determine, even though the channel is occupied, that there is a public base unit within its reception range. If no available communication channel is found and a signal from one or more public base units is detected, the handset unit generates a first alerting signal for its user thereby informing the user of the one or more public base units in the area even though a telephone call may not be initiated due to all of the communication channels then being occupied. If an available communication channel is found, an attempt to establish communication with a public base unit is initiated by the handset unit over this available channel. If no response is received from a public base unit and if a signal from one or more public base units is detected, the handset unit generates a second alerting signal which thereby informs the user of the one or more public base units in the area even though a telephone call may not be initiated due to all of these public base units then being busy.

42 Claims, 4 Drawing Sheets

METHOD AND APPARATUS FOR DETERMINING AVAILABILITY OF A PUBLIC BASE UNIT FOR COMMUNICATING WITH A CORDLESS TELEPHONE IN A PUBLIC CORDLESS TELEPHONE SYSTEM

BACKGROUND OF THE INVENTION

1. Technical Field

This invention relates to cordless telephones and more particularly to cordless telephone base units arranged for deployment in a public telephone system.

2. Description of the Prior Art

Telephone communications in public areas have traditionally been limited to a person using a public telephone where he or she could make either charge calls, pay calls or credit card calls. The mobility of the user has thus been limited to the immediate surroundings of the public telephone, as determined by the length of the telephone handset cord. Other alternatives, such as cellular telephone service and the new telepoint system, are expensive and therefore unattractive to many potential users.

One economical alternative to the public telephone is a public cordless telephone system. Such a system is described in U.S. Pat. No. 4,953,198 which issued to J. J. Daly et al. on Aug. 28, 1990. The public cordless telephone system includes a plurality of public base units that are accessible by a plurality of portable, or cordless, public handset units. Each one of these handset units is capable of establishing communications with each one of the base units over a plurality of predetermined communication channels. Communication over each one of these channels is by way of a radio frequency carrier signal that is modulated by control signals and audio signals to and from a public base unit as appropriate. And the public base units are connected to telephone lines for providing conventional telephone communications for the public handset units.

In the operation of the public cordless telephone system, establishing a communications link between the public handset unit and the public base unit is initiated by a user activating the handset unit. Once activated, the handset unit, in turn, interrogates each one of the plurality of predetermined communication channels in order to establish communications with a public base unit on a nonbusy, or available, one of these channels. Once the handset unit selects an available channel, it transmits a service request which includes an identification code over this channel. A public base unit within the reception range of the handset unit receives the handset unit's identification code, appends its own identification code to this received code and then transmits the combined handset unit identification code and public base unit identification code back to the handset unit. The handset unit receives this combined code from the public base unit and then compares the handset portion of the received code with the code that it previously transmitted. If a favorable comparison of this code and the handset portion of the code received from the public base unit is obtained, the communications link is then established between the handset unit and the public base unit on the selected communication channel.

In the United States, all cordless telephones currently are required to operate within the same allocated frequency spectrum. Thus the plurality of predetermined communication channels used by the public base units and public handset units in the public cordless system also are used by those base units and associated handset units employed in residential cordless telephone sets. As cordless telephone sets, in general, and both public base units and public handset units, in particular, increase in number, some service attempts initiated by the user of a public handset unit possibly will not be completed because the public handset unit will be unable to find a nonbusy, or available, communication channel on which to transmit its service request. Moreover, some service attempts initiated by the user of a public handset unit possibly will not be completed because all the public base units within reception range of the handset unit are then busy. Unfortunately, a user of a public handset unit that finds all the communication channels occupied is unable to determine whether he or she is within the reception range of a public base unit that is then busy or whether the communication channels are all occupied by residential base units communicating with their associated handset units. Also a user of the public handset unit that finds a communication channel available but does not receive a response from a public base unit to its service request is similarly unable to determine whether the handset unit is within the reception range of a public base unit that is then busy or whether the handset unit is outside of the reception range of all public base units.

SUMMARY OF THE INVENTION

In accordance with the invention, an arrangement is provided in a public cordless telephone system for conveying information from a public base unit to a public handset unit in such a manner that the public handset unit can determine when it is within the reception range of the public base unit even though a) all communication channels in the reception area are then occupied by either public or residential telephones, or b) the public base unit is then busy communicating with another public handset unit. In preferred embodiments, each public base unit while communicating with any public handset unit within the reception area inserts in the channel it is then occupying additional spectrum energy such as is provided by a pilot signal. This spectrum energy is detected by a public handset unit as it interrogates this occupied channel while searching for an available channel upon which it may transmit its service request, thereby allowing the handset unit to determine that the channel is occupied by a public, as opposed to a residential, base unit.

In one aspect of the invention, if the additional spectrum energy is detected but no available communication channel is found, the handset unit generates an alerting signal for its user thereby informing him or her of the presence of one or more public base units in the area even though a telephone call may not be initiated due to all communication channels then being occupied.

In another aspect of the invention, if an available communication channel is found, a service attempt is initiated, and no response is received from a public base unit, the handset unit, if it has detected the additional spectrum energy on other channels, generates an alerting signal which thereby informs the user of the presence of one or more public base units in the area even though a telephone call may not be initiated due to all public base units then being busy.

BRIEF DESCRIPTION OF THE DRAWING

The invention and its mode of operation will be more clearly understood from the following detailed description when read with the appended drawing in which.

Throughout the drawing, the same element when shown in more than one figure is designated by the same reference numeral.

DETAILED DESCRIPTION

Figure 1:
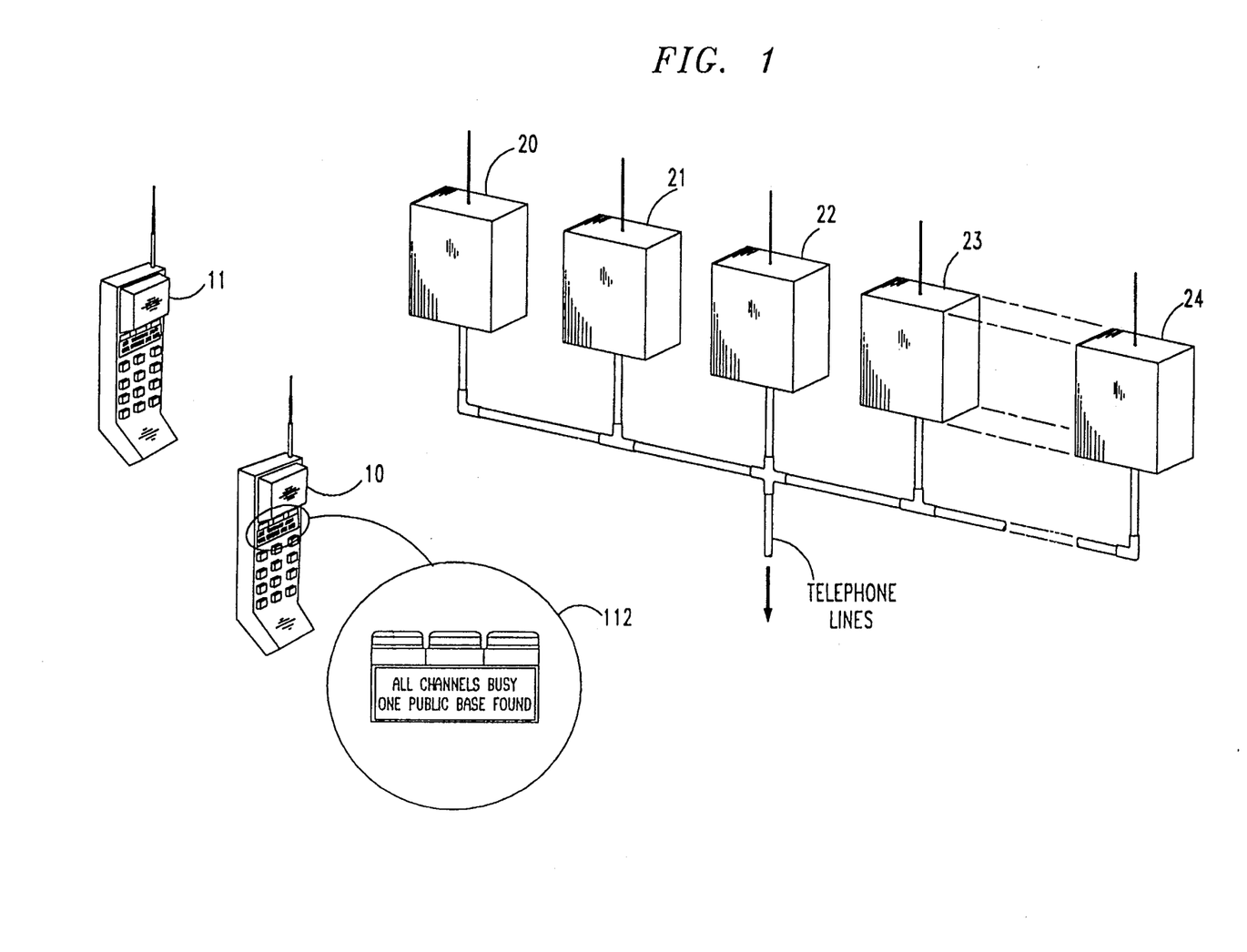
FIG. 1 depicts multiple handset units and multiple base units operative in accordance with the invention.

Referring now to FIG. 1 of the drawing, there are shown identical multiple cordless telephone handset units 10 and 11 and also identical multiple public base units 20 through 24. Each public base unit has its own assigned telephone tip-ring line and is capable of transmitting to and receiving from the handset units over each one of a plurality of predetermined communication channels. In the United States, ten communication channels in the 46 through 49 MHz band are available to date for use by cordless telephones. Each channel has two duplex frequencies, one on which the base unit transmits and the handset unit receives and the other on which the handset unit transmits and the base unit receives.

Communication attempts between a handset unit and public base units are initiated by a user activating the handset unit which, in turn, interrogates each one of the plurality of predetermined communication channels in an attempt to establish communications with a public base unit on one of those channels. When the handset unit is activated, it initializes a receiver and transmitter contained therein on a selected first one of the predetermined channels for respective reception and transmission thereon. If a public or residential base unit is then engaged with and communicating with another handset unit on this selected first channel, in accordance with the invention and as described in greater detail later herein, the type of busy status of this communication channel, i.e., public or residential, is detected and no transmission by the handset unit of the user attempting to establish communications is made on this channel. Rather, the handset unit advances to the next channel, determines if that channel is available, or free, and continues on in this manner until an available channel is located or all the channels have been interrogated.

The handset unit generates a service request signal on the first one of the predetermined channels determined to be available. If there is no answer within a predetermined time period, the handset unit automatically advances through the channels, interrogating each one, until it finds a second available channel and then similarly signals on this channel. A service request signal generated by the handset unit will go unanswered if 1) the handset unit is outside of the reception range of all of the public base units or 2) all of the public base units are busy. Thus if no answer is provided to the handset unit by a public base unit after the service request signal is generated on the second available channel, the handset unit provides an out-of-range indication or public-base-unit-busy indication in a handset unit status indicator 112, as appropriate and as described in greater detail later herein, to the user of the handset unit.

Figure 2:
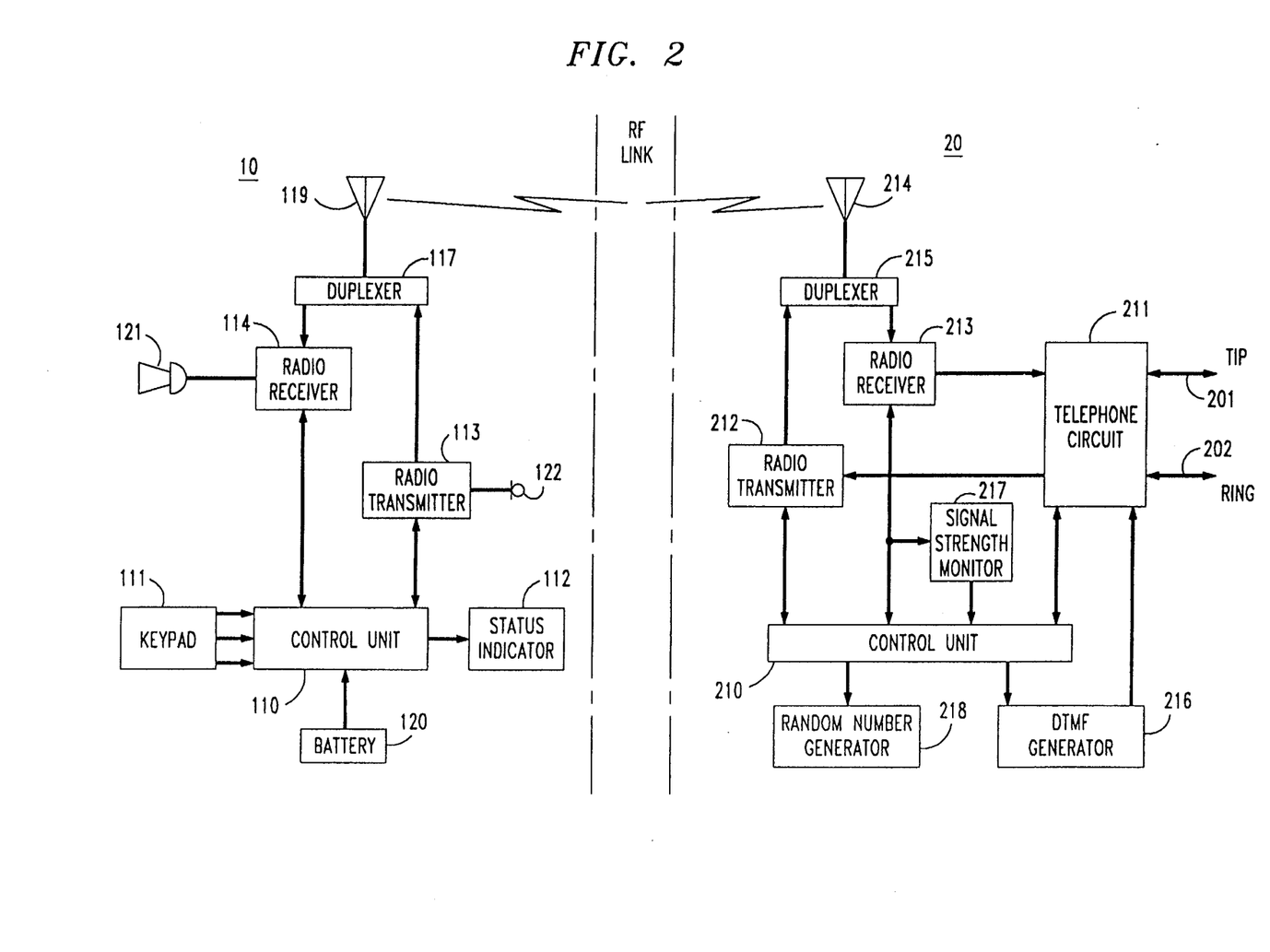
FIG. 2 is a block representation of the major functional components of one of the handset units and one of the public base units depicted in FIG. 1, operative in accordance with the invention.

Referring next to FIG. 2, there is shown a functional block representation of a public cordless telephone system operative in accordance with the principles of the invention. As shown, the public cordless telephone system generally comprises at least one handset unit 10 and at least one public base unit 20. With regard to the functional components illustratively described for handset unit 10, the handset unit 11, shown in FIG. 1, incorporates the same components as this handset unit and is operationally identical. Similarly, the public base units 21 through 24 of FIG. 1 incorporate the same components as the public base unit 20 and also are operationally identical.

Included in the handset unit 10 is a control unit 110 which advantageously provides a number of control functions. This control unit 110 may be implemented through the use of a microcomputer containing read-only-memory (ROM), random-access-memory (RAM) and the proper coding of this microcomputer. Such a microcomputer is known in the art and is readily available from semiconductor manufacturers such as Fujitsu, Motorola and NEC.

The control unit 110 generates an 8-bit identification code that is transmitted from the handset unit 10 to the public base unit 20 while establishing initial communications. This control unit 110 also configures a radio frequency (RF) transmitter 113 and a RF receiver 114 for operation on each of the plurality of predetermined communication channels for communicating with a selected one of the plurality of public base units operating on the selected predetermined channel. The transmitter 113 and the receiver 114 respectively transmits signals to and receives signals from the public base unit 20, with the control unit 110 providing channel control information to both units. The transmit and receive signals of the handset unit 10 are coupled to a duplexer 117 which permits the transmitter 113 and the receiver 114 to both simultaneously operate over antenna 119 while preventing the output of transmitter 113 from being coupled directly to the input of the receiver 114. The receiver 114 also demodulates voice signals transmitted by the public base unit 20 and couples these signals to a loudspeaker 121. The transmitter 113 has as its input speech signals from a microphone 122 which it transmits to the public base unit 20.

In operation, the receiver 114 is initially configured for sequentially interrogating and detecting an available channel for communicating with one of the plurality of public base units, such as base unit 20. As the receiver 114 interrogates each communication channel, those that it detects as having a carrier thereon are assigned a busy status and are further interrogated, in accordance with the invention, as to whether the communication channel is then occupied by a public base unit communicating with a public handset unit or a residential base unit communicating with its associated handset unit. This determination is advantageously achieved by configuring the receiver 114 such that it detects, along with the normal audible frequency portion of the communication channel, the spectrum energy inserted only by a public base unit in the channel between, for example, 3.5 KHz and 10 KHz. This spectrum energy may be in the form of a pilot signal operating at approximately 7.5 KHz. At this frequency, the pilot signal generated by the transmitter of the public base unit is not audible to a user of the handset unit then communicating with that public base unit, since the audible frequency portion of the communication channel generally is limited to the frequencies between 300 Hz and 3300 Hz. Demodulation of a carrier by a receiver to recover selective information, such as the additional spectrum energy superimposed on the carrier, is well known to those skilled in the art and thus is not further described herein.

The additional spectrum energy, outside of the audible frequency portion but in each communication channel interrogated, is detected by the radio receiver 114 and a signal indicative of its presence is provided to the control unit 110. The control unit 110 then stores in RAM this data that is reflective of each one of the communication channels occupied by a public base unit communicating with another handset unit. If the handset unit attempting to find an available channel for generating the service request signal does not eventually find such channel during its interrogation of the plurality of predetermination communication channels, the number of communication channels that were found having the additional spectrum energy is provided to a user of the handset unit enabling him or her to know that the handset unit is then located within the reception range of one or more public base units.

When an available communication channel is detected by the receiver 114, the channel information is provided by the receiver 114 to the control unit 110. The control unit 110 processes the appropriate channel selection and identification code data selected for use in the handset unit 10 and generates the service request signal which is transmitted by transmitter 113 over the available communication channel. This service request signal is a frequency shift keying (FSK) signal and includes, for example, a 545 millisecond preamble and a 16.5 millisecond synchronizing signal immediately followed by a request-for-service message which comprises a 37 millisecond data field. Included in this data field are an 8-bit service request code and the 8-bit identification code generated by the control unit 110.

The handset unit 10 may find an available channel and generate a service request signal which goes unanswered. It is anticipated that in certain electromagnetic environments, the handset unit could be within the reception range of some public base units which are busy and outside the reception range of other public base units. Or possibly these other base units may not be in service at the time of the interrogation. For a condition where during its interrogation the handset unit finds at least two available channels, generates a service request on each and fails to receive an answer on either, the handset unit ceases generating the service request signal, but continues to interrogate each of the remaining communication channels for the presence of the additional spectrum energy indicative of a public base unit in the reception area. Thus and in accordance with the invention, even though no public base units are then available to respond to the handset unit generating the service request signal, the user of the handset unit will be informed during such condition if any of the busy communication channels are occupied by a public base unit communicating with another handset unit. Through this procedure, the user of the handset unit will be made aware of the existence of any public base units within the reception area of the handset unit.

A battery 120 is included in the handset unit 10 and provides operating power for all circuitry in this unit. Also included in the handset unit is a keypad 111 and the handset unit status indicator 112. The keypad 111 is used for entering dial digits or control functions executed by the control unit 110 in the handset unit. The handset unit status indicator 112 provides a battery status indication reflective of the charge on the battery 120. The handset unit status indicator 112 also provides other specific status information and contains an acoustic alerter and an alphanumeric display comprised of, for example, light emitting diodes (LEDs) or a liquid crystal display (LCD) suitably arranged for providing the desired status indications to a user. This status indicator 112 is connected to the control unit 110 and provides an indication to the user of the handset unit when 1) a communications link has been established between the handset unit 10 and a public base unit, 2) a communications link cannot be established due to the handset unit being outside of the reception range of a public base unit or, in accordance with the invention, 3) a communication link cannot be established either due to all communication channels being occupied or all public base units being busy. When all communication channels are occupied and/or public base units are busy, the status indicator 112, in preferred embodiments, advantageously provides an indication to the user of the handset unit of the number of communication channels then occupied by public base units.

During the time that the public base unit 20 is not involved in a call with a handset unit, it repeatedly scans all of the predetermined communication channels spending 20 milliseconds per channel looking for the preamble that is part of the transmission of a handset unit generating a service request signal. The 545 millisecond preamble transmitted by the handset unit 10 provides sufficient time for public base unit 20 to scan each of the predetermined communication channels and arrive at the channel having the preamble sometime before the beginning of both the synchronizing signal and the request-for-service message. If other nearby public base units, for example public base units 21 through 24, are available and located within the reception range of the signal from handset unit 10, these base units also will be scanning over the predetermined channels and will detect the preamble sometime before the beginning of the synchronizing signal and the request-for-service message. Thus, upon detection of the preamble, each of the public base units will stop scanning the predetermined channels and remain on the channel having the preamble in order to receive and respond to the request-for-service message. As explained in greater detail later herein, contention for access to the handset unit 10 by the public base unit 20, and other base units similar configured, is resolved by assigning a specific one of a plurality of times during which the base unit may respond to the service request signal from the handset unit 10.

Contained in the public base unit 20 is a control unit 210 which interfaces with control unit 110 in the handset unit 10 for receiving the service request signal and for establishing a two-way communications link between a handset unit and the public base unit 20. Also contained in the public base unit 20 are a transmitter 212 and receiver 213 for communicating with the selected handset unit. The output of the transmitter 212 and input for the receiver 213 are commonly coupled to an antenna 214 through a duplexer 215.

The control unit 210 receives and processes the service request signal received from the handset unit 10. The 8-bit identification code, generated by the control unit 110 and provided in the service request signal, is combined with an 8-bit identification code assigned to the base unit 20. This 16-bit combined code is then stored in RAM in the control unit 210. The control unit 210 also transmits this combined code via FSK signals back to the control unit 110 in handset unit 10. The handset unit receives this combined code from the public base unit and then compares the handset portion of this received code with the code that it previously transmitted. If a favorable comparison of the handset portion of the combined code received from the public base unit and the handset unit's previously transmitted code is obtained, communications is established between the handset unit and the public base unit on the selected channel. The combined code thus uniquely identifies a) the handset unit transmitting the original code, and thereby requesting service, as well as b) the public base unit responding to the service request signal.

Once a communications link with any public base unit is established by a handset unit on a selected communication channel, other cordless handset units are precluded from interfering with or establishing communications on this channel with the engaged public base unit. Even if a handset unit erroneously determines that an occupied channel is idle and transmits a service request signal, the base unit will ignore this service request signal because the identification code of the handset unit attempting to interrupt is different from the identification code that is then being used for all message signals between the public base unit and the earlier linked handset unit over the selected communication channel.

The control unit 210 also receives and processes op-code data provided by the handset unit 10 in dialing and providing tone signaling information out to a central office via telephone circuit 211 and tip-ring lines 201 and 202. The telephone circuit 211 serves as a "plain old telephone service" (POTS) interface for signals on the tip-ring lines and those respectively received by receiver 213 and transmitted by transmitter 212. Responsive to the control unit 210, a dual-tone-multiple-frequency (DTMF) generator 216 provides the signaling tones to the telephone circuit 211 for transmission over the tip-ring lines 201 and 202. The tip-ring lines 201 and 202 are preferably connected to a "charge-a-call" line which is provided with call screening, call blocking, call rating, and fraud protection through the telephone company's operator services position system (OSPS) facilities for noncommercial credit card calls and through the telephone company's call processor for commercial credit card calls. The tip-ring lines 201 and 202 also may be connected to the telephone company central office via a measured business service line, typically referred to as a "1MB" line. In this arrangement, call screening, call blocking, call rating, and fraud protection are provided through the public base unit. A method for providing this type of protection for a telephone connected to a 1MB line is disclosed in U.S. Pat. No. 4,782,516 issued to R. L. Maybach on Nov. 1, 1988.

In operation and in accordance with the invention, the radio transmitter 212 in the public base unit 20 includes additional spectrum energy in the communication channel while transmitting to a public handset unit. This additional spectrum energy is used in identifying a transmitted signal on an occupied communication channel as being from a public base unit. When a communications link has been established over a communication channel between the public base unit 20 and a public handset unit, the public base unit 20, and other public base units similar configured, provides additional spectrum energy in the channel via radio transmitter 212. This spectrum energy is located outside of the audible frequency portion of the communication channel and, as earlier indicated, typically may be in the form of a pilot signal operating at 7.5 KHz. This spectrum energy in the channel is in addition to the spectrum energy of voice signals and normal control signals which is transmitted in the audible frequency portion of the channel to the public handset unit then engaging the base unit 20. By providing this additional spectrum energy in the communication channel, another public handset unit while searching for a free channel and interrogating this channel will be able to determine, even though the channel is busy, that there is a public base unit within its reception range. The modulating signal for the spectrum energy is generated by the control unit 210 and coupled to the radio transmitter 212. The radio transmitter 212 then modulates with the additional spectrum energy the carrier frequency for the one of the predetermined communication channels upon which it is then transmitting. Modulating a carrier to superimpose information thereon is well known by those skilled in the art and is not described in detail herein. For example, modulating the base unit carrier with the additional spectrum energy easily may be obtained in the transmitter 212 in the same conventional manner as the carrier for a standard residential cordless telephone base unit is modulated with voice signals.

The public base unit 20 detects radio link quality through use of a signal strength monitor circuit 217. This circuit is capable of differentiating between a range of receive signal levels and may be, for example, a received signal strength indicator (RSSI) circuit. An RSSI circuit produces an output voltage that is proportional to the strength of the received signal from the handset unit. Through use of an analog-to-digital converter associated with the signal strength monitor circuit 217, a corresponding digital signal output representative of the strength of the receive signal is selected from within the range of receive signal levels and provided to the control unit 210.

In a first application of this digital signal, the control unit 210 compares this voltage relative to a predetermined lower threshold level. If during the setting up of the call, the control unit determines that the communications link would be poor because of the received signal quality, the control unit does not allow the public base unit to respond to a handset unit requesting service. Also during operation, if the communications link between the handset unit and the public base unit degrades to a quality less than the predetermined lower threshold level, the control unit 210 causes the public base unit to generate an audible and distinctive tone which is recognizable to the user that he or she is then approaching the outer limit of the operating range for that handset unit in the public cordless telephone system.

If a handset unit happens to be within the reception range of two or more public base units that are capable or responding to the handset unit on the same channel, collision between these base units in responding to the handset unit may result. Thus if more than one public base responds to a handset unit at the same time, each acknowledge signal received by the handset unit is very likely to be rendered unintelligible by the other one or more received acknowledge signals and the handset unit is forced to ignore all the acknowledge signals and go through the process of generating another service request signal either on that channel or on another channel, hopefully with more favorable results the second time.

In order to prevent this collision and in a second application of the digital signal reflective of a receive signal level, the control unit 210 employs the digital signal to assist in resolving the contention between multiple public base units attempting to respond to a service request signal generated by a handset unit. In this application, the time for response for the public base unit is determined by the received strength of the signal from the handset unit. Thus when two or more public base units receive the same service request signal from a handset unit, a public base unit having the greater received signal strength from the handset unit would also have the earlier occurring response time for responding to the handset unit. Such an implementation of the operation of a base unit, in a public cordless telephone system is described in copending U.S. patent application, Ser. No. 07/704,516, commonly assigned with this application to the same assignee and filed on May 23, 1991.

Contention between base units also may be resolved through use of a random number generator such as generator 218 included in the public base unit 20. In operation, the base unit generates a random number and assigns a time at which the base unit may respond to the handset unit as a function of the generated random number. Thus when two or more public base units receive the same service request signal from a handset unit, a first public base unit having a random number of a smaller magnitude than the random number of a second public base unit would also have assigned thereto an earlier occurring response time for responding to the handset unit. This implementation for the operation of a base unit in a public cordless telephone system also is described in the aforementioned copending U.S. patent application, Ser. No. 07/704,516.

Contention between base units also may be resolved through use of an implementation which uses both the receive signal strength level from the handset unit and the generation of the random number. In this implementation, contention between base units is avoided by assigning the time during which a public base unit may respond to a handset requesting service 1) as a function of the received signal strength from the handset unit and 2) as determined by the generation of the random number. This operation provides a response time reflective of the received signal strength from the handset unit, the earlier occurring response time being provided to the base unit receiving the stronger signal. And through generation of the random number, a random factor is also provided in this response time.

Figure 3:
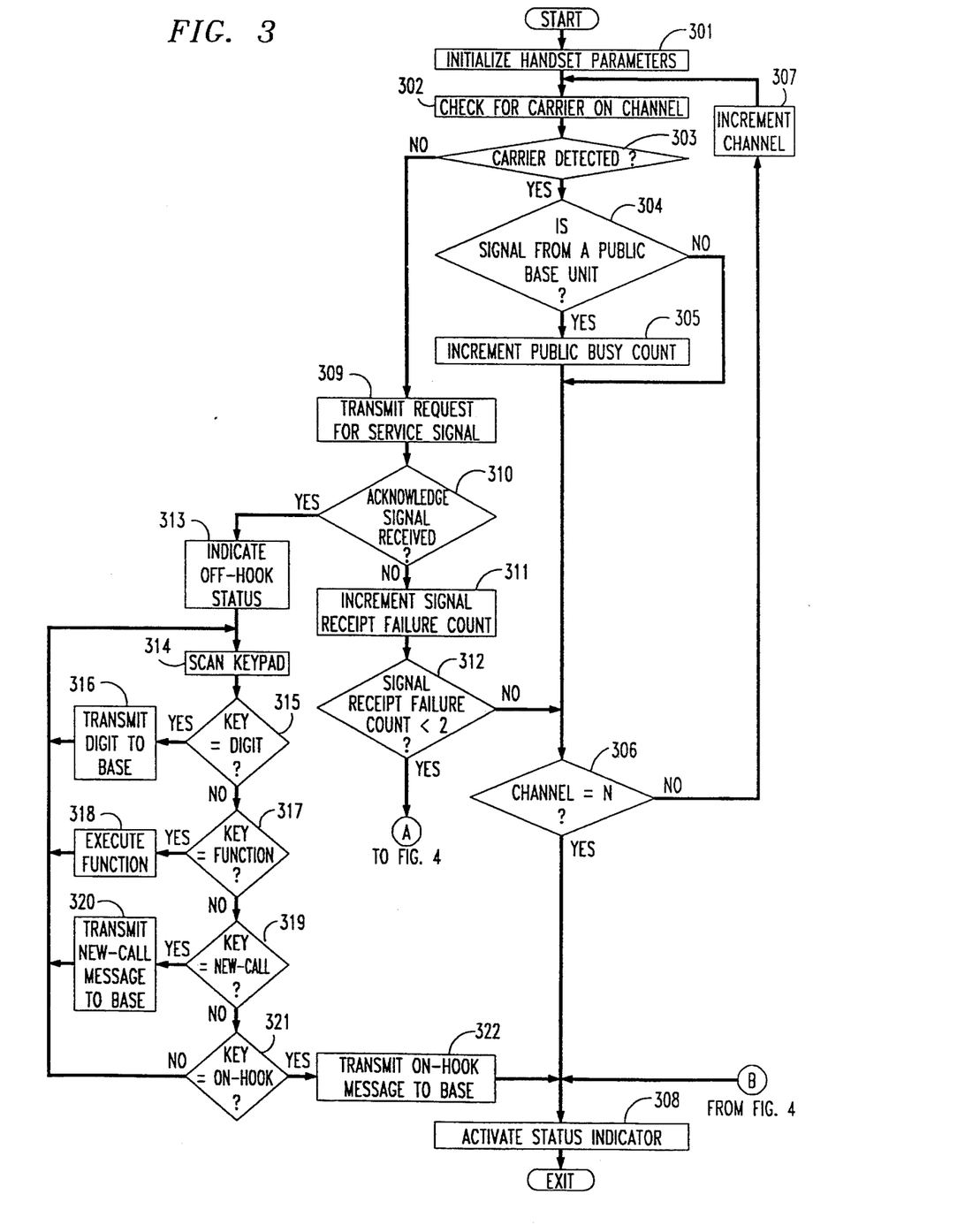
FIGS. 3 and 4 depict flow charts illustrating the operation of the handset unit of FIG. 2, in accordance with the invention.
Figure 4:
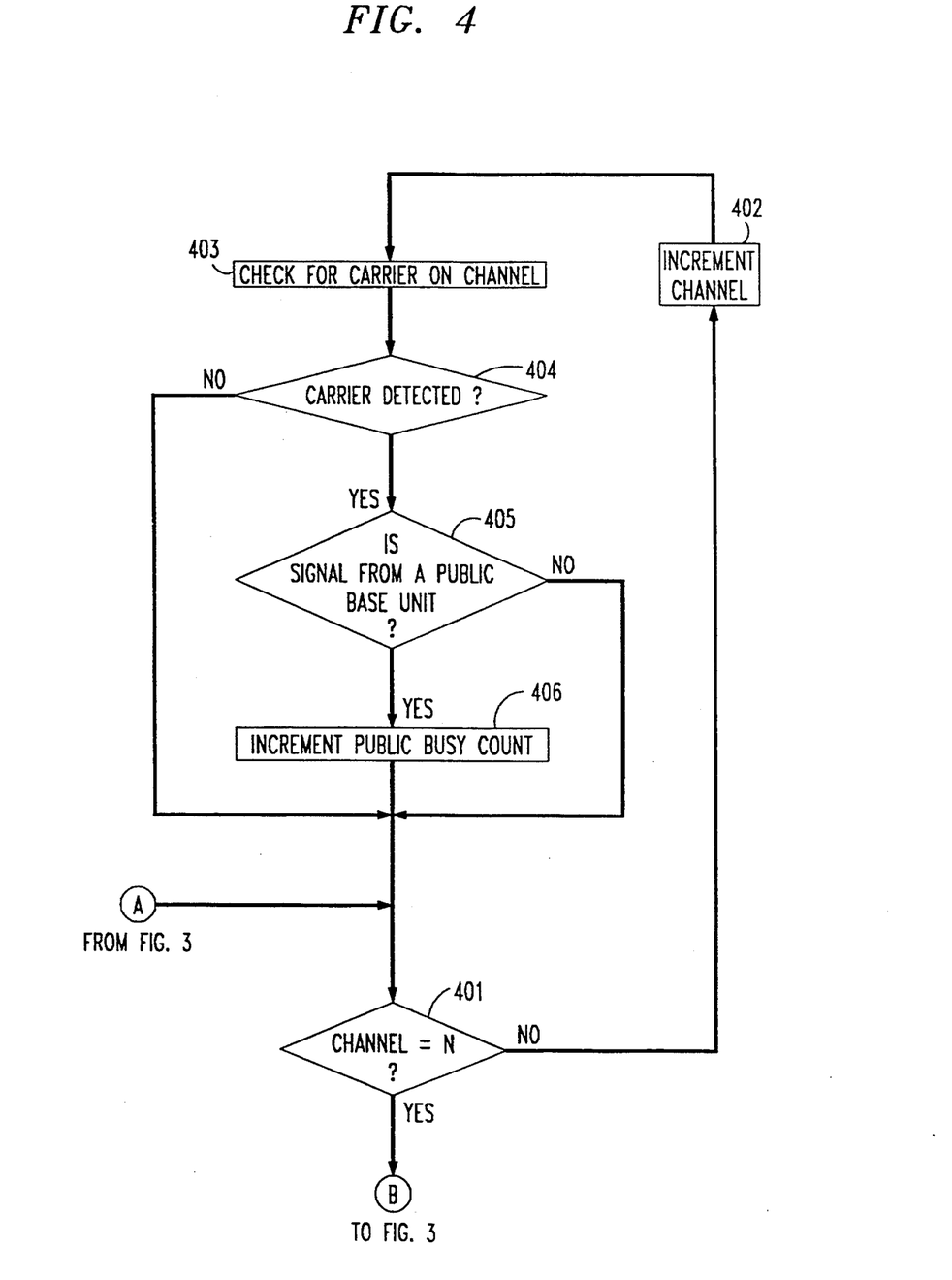

FIGS. 3 and 4 in combination are flow charts illustrating an implementation of the handset unit 10 for operating in a public cordless telephone system with the desired functionality. Reference to FIG. 2 along with FIGS. 3 and 4 is suggested. The functions in these flow charts are advantageously provided by a process or program stored in ROM contained in the control unit 110.

The process is entered in step 301 where the user activates the handset unit causing the initializing parameters to be set. These parameters include generating the identification code which is transmitted by the handset unit as part of the service request signal. Also, the handset unit receiver is set on a preselected one of the predetermined communication channels. This preselected channel may differ for each handset unit and may even be randomly selected from among the predetermined communication channels, as appropriate. The channels number between one and "N" and are limited only by the available number of communication channels allocated for this use. As earlier indicated herein, in the United States there are presently 10 duplex communication channels available for use with cordless telephones. It is to be understood, however, that "N" could be any reasonable number less than or considerably greater than 10 should other frequency allocations for cordless telephone communication channels be made. A signal-receipt-failure counter and, in accordance with the invention, a public-base-unit-busy counter are set at zero as pan of the initializing step.

The process next advances to step 302 where the receiver 114 listens for a carrier on the first selected communication channel. It then advances to decision 303 where a determination is made as to whether a carrier is detected on the channel. If a carrier is detected at decision 303, the process advances to decision 304 where a determination is made as to whether the signal on the channel is one from a public base unit. This is achieved by examining the modulation that is on the carrier operating at the duplex frequency reserved for any base unit on the channel. The receiver 114 determines whether this carrier is modulated by a signal which provides additional spectrum energy outside of the audible portion of the communication channel. As earlier indicated herein, this additional spectrum energy identifies a transmitted signal on an occupied channel as being from a public base unit. If at decision 304, it is determined that a public base unit is occupying the channel, the process advances to step 305 where the public-base-unit-busy counter is advanced one count. If at decision 304, it is determined that a public base unit is not occupying the channel, the process advances from this decision, as well as from step 305, to decision 306 where a determination is made as to whether the channel being interrogated is "N," or the last one of the predetermined communication channels. If the channel being interrogated is not the last different channel that can be, the process advances to the increment channel step 307 wherein the next one of the predetermined communication channels is selected for interrogation. From this step, the process returns to step 302 where a check is made for carder on this new channel. The process then continues on in this routine to interrogate any occupied channels in the manner described above.

If at decision 306, it is determined that the channel just interrogated was the last selectable one of the predetermined communication channels, the process advances to step 308, where the status indicator, shown in FIG. 1, on the handset unit 10 is activated for providing an indication of the status of the interrogated communication channels. For a first signal receipt condition, if a carrier is detected in decision 303 and no additional spectrum energy is detected in the signal from the base unit in decision 304 on any of the interrogated communication channels, then the status indicator provides an indication that all of the channels are busy and that none are occupied by public base units. For a second receipt condition, if a carder is detected in decision 303 and additional spectrum energy is detected in the signal from the base unit in decision 304, the status indicator provides an indication that all of the interrogated channels are busy and that a certain number of these busy channels, as represented by the unit count provided by step 305, are occupied by public base units.

Referring once again to decision 303, if a carrier on the selected communication channel is not detected, the process advances to step 309 where a service request signal is transmitted by the handset unit on the selected communication channel. This signal includes a preamble, a synchronizing signal and an identification code then selected by the handset unit. The process next advances to decision 310 where it is determined if an acknowledge signal transmitted by a public base unit has been received by the receiver in the handset unit. Such a signal from a public base unit must include the identification code initially transmitted by the handset unit. Otherwise, the handset unit will not respond to the acknowledge signal. This returned handset identification code is accompanied by a distinct identification code from the public base unit appended to the identification code of the handset unit. If the acknowledge signal is not received within approximately two seconds, the process advances to step 311 wherein the signal-receipt-failure counter is incremented one count.

From step 311, the process advances to decision 312 where a determination is made as to whether the signal-receipt-failure count is less than 2, as then reflected in the step 311. If the count is less than 2, the process advances to the decision 306 where it is determined whether this channel being interrogated is "N" or the last one of the predetermined frequency channels. If this is not the last different channel, the process advances to the increment channel step 307 wherein the next one of the predetermined communication channels is selected and interrogated.

If it is determined at decision 312 that the signal receipt failure is not less than 2, the process advances to the routine shown in FIG. 4, which is entered at decision 401. Once the service request signal has been transmitted by the handset unit 10 more than once, it is unlikely that an available public base unit then exists within the reception range of the handset unit. Otherwise the handset unit would have received an acknowledge signal response to one of its two service request signals. Such a result is expected since the public base units, when available, scan each one of the plurality of predetermined channels sufficiently fast and would have detected the preamble in the service request signal on either of the two different channels selected for signaling and signaled upon by the handset unit. Thus through this procedure and at this point in the process, the handset unit has determined that no public base unit is then available within its reception range. The handset unit has not determined, however, how many communication channels yet uninterrogated by it have public base units operating thereon. The routine illustrated in FIG. 4. enables the handset unit to quickly interrogate each of the remaining communication channels up to "N" and then provide the result of this further interrogation to the status indicator which, in turn, informs the user of the handset unit.

From decision 312 in FIG. 3, the process advances to the decision 401 in FIG. 4 where a determination is made as to whether the channel being interrogated is "N," or the last one of the predetermined communication channels. If the channel being interrogated is "N," the process advances to the step 308 where the status indicator displays the appropriate accumulated information for the user of the handset unit. If, however, the channel being interrogated is not "N," the process advances to the increment channel step 402 wherein the next one of the predetermined communication channels is selected. From this step, the process next advances to step 403 where the receiver 114 in the handset unit 10 listens for a carrier on this channel. It then advances to decision 404. If a carrier is not detected at decision 404, the process advances directly to decision 401. If a carder is detected at decision 404, however, the process advances to decision 405 where a determination is made as to whether the transmitted signal on this occupied channel is from a public base unit. If at decision 405, it is determined that a public base unit is occupying the channel, the process advances to step 406 where the public-base-unit-busy counter is advanced one count. If at decision 405, it is determined that a public base unit is not occupying the channel, the process advances from this decision, as well as from the step 406, to decision 401 where a determination is made as to whether the channel being interrogated is "N," or the last one of the predetermined communication channels. If the channel being interrogated is not the last different channel that can be, the process advances to the increment channel step 402 and continues in this routine in the manner described above. If the channel being interrogated is the last different channel, the process advances to step 308 in FIG. 3 where the status indicator is activated reflecting the status of all of the interrogated communication channels. From step 308 the process is exited.

Since varying signal receipt conditions may exist for the handset unit, the status indicator reflected in step 308 is multifold in functionality. This indicator provides an indication not only that a communications link between the handset unit and a public base unit cannot be established because the handset unit is outside of the reception range of a public base unit, but also provides an indication that some channels are busy and that public base units are occupying one or more of these channels, as appropriate. Although, for these conditions, the process is exited with the user of the handset unit being unable to complete a telephone call, the user also knows by this attempt when he or she is within the reception range of one or more public base units which then happen to be busy.

Referring more specifically to these varying signal receipt conditions, if, for example, it is determined 1) at decisions 306 and 401 that the channel interrogated was the last one available among the predetermined communication channels, 2) at decision 310 that no acknowledge signal was received and 3) at decisions 304 and 405 that no public base units were detected, then when the process advances to step 308 the status indicator provides the indication that a communications link between the handset unit and a public base unit cannot be established because the handset unit is outside of the reception range of a public base unit. If, on the other hand, it is determined 1) at decisions 306 and 401 that the channel interrogated was the last one available among the predetermined communication channels, 2) at decision 310 that no acknowledge signal was received and 3) at decisions 304 and 405 that public base units were detected, then when the process advances to step 308, the status indicator provides an indication that a communications link between the handset unit and a public base unit cannot be established, but also that the handset unit is within the reception range of one or more public base units that are then busy.

If the appropriate acknowledge signal is received at decision 310, a communications link between the handset unit and the public base unit is established with the base unit providing dial tone to the handset unit and the handset unit, in turn, providing in step 313 an off-hook indication to the handset user so that he or she knows that communications has been established with the base unit.

Once the communications link is established between the handset unit and a base unit, the process advances to step 3 14, the first step in a series of steps wherein the user requests are processed. In step 314, the keypad is scanned for the entry of a digit. In decision 315, any digit entered on the keypad is detected and this digit transmitted to the base unit as reflected by step 316. The information transmitted to the base unit in this step, as well as other steps in this pan of the routine, is provided in the form of an opcode message and contains the combined handset unit and base unit identification code and data representative of the digit entered on the keypad.

If the entry of a digit is not detected on the keypad in decision 315, the process advances to decision 317 which monitors the activation of function keys. When a function key is activated, the function represented by such key is executed in step 318. Function keys provide local enhancements and convenience to the handset unit user. One such function key transmits the handset unit user's calling card number to the base unit upon request. Security is maintained, however, in that before the calling card number is transmitted, the handset unit requires its user to provide a security access number consisting of, for example, four digits. And the user is allowed a prescribed number of attempts, such as eight, to enter these digits correctly. Once a user has called up this function and entered an incorrect access number more than the prescribed number of times, the calling card number is erased. This information in the handset unit may be restored only through reprogramming. The calling card number of the owner of the handset unit is thus protected if he or she loses or misplaces the handset unit.

If the depression of a function key is not detected by decision 3 17, the process advances to decision 319 which looks for a depression of the new-call key. Such key may be, for example, the "#" key. Depressing this key allows sequence calling and indicates that the user of the handset unit wishes to terminate the existing call and make a new call. If the new-call key is depressed the process advances to step 320 and transmits the appropriate opcode message to the base unit. If the new-call key is not depressed, the process advances to decision 321 which looks for a depression of the on-hook key reflecting that the user desires to terminate the existing call. If this on-hook key has not been depressed, the process returns to step 314 and repeats this routine. If this on-hook key has been depressed, however, the process advances to step 322 where the appropriate opcode message is transmitted to the base unit, thereby releasing it from this handset unit. Next the process advances to the status indicator step 308 where an on-hook indication is provided to the user of the handset unit. The process is then exited.

Although a specific embodiment of the invention has been shown and described, it should be understood that it is but illustrative and that various modifications may be made therein without departing from the spirit and scope of the invention. In an alternative implementation of the public cordless telephone system, for example, the spectrum energy inserted into the communication channel by the public base unit may be provided as a FSK signal. In such an implementation, digital data in the FSK signal not only identifies the base unit as a public base unit, but also identifies a particular service provider as, for example, providing the telephone line for connecting that public base unit to a telephone central office. A handset user may want to initiate a telephone call only through a public base unit provided by a certain service provider since certain desirable communication options or features available from one service provider may not be available from another.

In this alternative implementation of this public cordless telephone system, the FSK MARK and SPACE signals are placed in the communication channel by the base unit transmitter in the spectrum space between 3.5 KHz and 10 Khz. More specifically, a MARK frequency of 8182 Hz and a SPACE frequency of 8824 Hz is provided. Selection of these frequencies permit digital data easily to be sent to a handset unit at a 125 bit-per-second rate. This digital data, when received by a suitably configured handset unit interrogating the communication channels in an attempt to find an available one, advantageously permits the handset unit to inform its user not only of the presence of a public base unit, but also whether the available public base unit is being provided by the service provider of choice. Thus, even if all public base units and/or communication channels in the area are busy when the handset unit user attempts a telephone call, the handset unit user will, by this attempt, have all the information necessary to decide whether he or she will want to stay in the same reception area and wait for an available public base unit or communication channel, as appropriate, or move on to another reception area where the desired service provider of choice may be reached.

In yet another alternative implementation of the public cordless telephone system, the spectrum energy inserted into the communication channel by the transmitter in each public base unit may be provided within a frequency range below the given audio frequency band of 300 Hz to 3300 hz. In such an implementation, the spectrum energy provided as, by way of example, a low frequency pilot signal may be detected by a suitably configured handset unit as the handset unit interrogates the available communication channels searching for an available one upon which to send its service request signal. Thus, with an appropriate interrogation rate suitable for this lower frequency, the handset unit is also able to determine, through this implementation, whether a public base unit is available within its reception area when all of the communication channels and-/or public base units within that area are busy. It is to be understood, therefore, that within the scope of the appended claims, the invention may be practiced otherwise than as specifically described.

We claim:

1. A cordless telephone public base unit for operation in a public cordless telephone system, the public base unit being connectable to a telephone line for communicating with a central office and the telephone system including a plurality of cordless handset units for establishing communications with the public base unit over a plurality of communication channels occupyable by both the public base unit and a non-public base unit, the public base unit comprising:

means for communicating with a first one of the plurality of cordless handset units over one of the plurality of communication channels; and means for inserting a signal in said one of the communication channels while communicating with said first one of the plurality of cordless handset units for providing to other of the plurality of cordless handset units identifying information for detection by said other of the plurality of cordless handset units while searching for an available communication channel, said identifying information being indicative of a public base unit communicating over said one of the communication channels.

2. The cordless telephone public base unit as in claim 1 wherein the means for communicating with the first one of the plurality of handset units comprises transmitting means for transmitting signals from the public base unit to the first one of the plurality of handset units and receiving means for receiving signals in the public base unit from the first one of the plurality of handset units.

3. The cordless telephone public base unit as in claim 1 wherein the identifying information comprises spectrum energy for modulating a carrier for the communication channel.

4. The cordless telephone public base unit as in claim 3 wherein the spectrum energy comprises a pilot signal located outside of an audible frequency portion of the communication channel.

5. The cordless telephone public base unit as in claim 3 wherein the spectrum energy comprises a frequency shift keying (FSK) signal located outside of an audible portion of the communication channel.

6. The cordless telephone public base unit as in claim 5 wherein the FSK signal provides means for identifying said public base unit associated with a particular available service.

7. A cordless telephone handset unit for operation in a public cordless telephone system, the telephone system including at least one public base unit connectable to a telephone line for communicating with a central office and to the handset unit over a plurality of communication channels, and wherein the communication channels are occupyable by both the public base unit and a non-public base unit, the handset unit comprising:
means for receiving a signal on at least one of the plurality of communication channels; and
means for detecting the presence of said public base unit occupying at least one of the plurality of communication channels while searching for an available communication channel, the detecting means being responsive to base-unit-type identifying information inserted in the signal on each one of the plurality of channels occupied by said public base unit while communicating with another handset unit.

8. The cordless telephone handset unit as in claim 7 wherein the detecting means further comprises means for interrogating each one of the plurality of communication channels for the identifying information.

9. The cordless telephone handset unit as in claim 8 further comprising alerting means responsive to the detecting means, in response to the detecting means detecting the presence of identifying information on said communication channel, the alerting means generating a first distinctive alerting signal in the handset unit indicative of the public base unit occupying the communication channel.

10. The cordless telephone handset unit as in claim 9 wherein the alerting means generates a second distinctive alerting signal in the handset unit representative of the total number of public base units occupying the communication channels.

11. The cordless telephone handset unit as in claim 10 wherein the communication channels are occupiable by both said public base units and non-public base units, and wherein the alerting means, responsive to the interrogating means, generates a third distinctive alerting signal in the handset unit when all of the communication channels are occupied by any combination of these said public base units and a fourth distinctive alerting signal in the handset unit when at least one of the communication channels is available.

12. The cordless telephone handset unit as in claim 7 wherein the identifying information includes spectrum energy inserted into the communication channel by the public base unit.

13. The cordless telephone handset unit as in claim 12 wherein the spectrum energy comprises a pilot signal located outside of an audible portion of the communication channel.

14. The cordless telephone handset unit as in claim 12 wherein the spectrum energy comprises a frequency shift keying (FSK) signal located outside of an audible portion of the communication channel.

15. The cordless telephone handset unit as in claim 14 wherein the FSK signal provides means for identifying said public base unit associated with a particular available service.

16. A cordless telephone handset unit for operation in a public cordless telephone system, the telephone system including at least one public base unit connectable to a telephone line for communicating with a central office and for transmitting signals to and receiving signals from the handset unit over a plurality of communication channels occupiable by both the public base unit and, a non-public base unit, the handset unit comprising:
means for interrogating the plurality of communication channels, the interrogating means identifying both an available channel from among the communication channels and the presence of a public base unit operating on at least one of any occupied ones of these communication channels;
means for generating a service request signal on each identified available channel for establishing communications with said public base unit; and
means for inhibiting the service request signal generating means after the generation of a predetermined number of service request signals, the interrogating means, responsive to the inhibiting means, interrogating the remainder of the plurality of communication channels only for identifying said public base units operating on the occupied ones of these communication channels.

17. The cordless telephone handset unit as in claim 16 further comprising alerting means responsive to the interrogating means, the alerting means generating a distinctive alerting signal in the handset unit indicative of the number of public base units occupying the plurality of communication channels in response to the interrogating means identifying said public base units operating on the communication channels.

18. The cordless telephone handset unit as in claim 16 further comprising sensing means for detecting the presence of public base units operating on the occupied ones of the plurality of communication channels, the sensing means being responsive to identifying information included on each one of the channels occupied by the public base units.

19. The cordless telephone handset unit as in claim 18 wherein the identifying information comprises spectrum energy for modulating a carrier for each communication channel.

20. The cordless telephone handset unit as in claim 19 wherein the spectrum energy comprises a pilot signal located outside of an audible frequency portion of the communication channel.

21. The cordless telephone handset unit as in claim 20 wherein the spectrum energy comprises a frequency shift keying (FSK) signal located outside of an audible portion of the communication channel.

22. The cordless telephone base handset unit as in claim 21 wherein the FSK signal provides means for identifying a public base unit associated with a particular available service.

23. A method of operating with a cordless telephone public base unit in a public cordless telephone system, the public base unit being connectable to a telephone line for communicating with a central office and the telephone system including a plurality of cordless handset units for establishing communications with the public base unit over a plurality of communication channels occupyable by both the public base unit and a non-public base unit, the method comprising the steps of:
communicating in the public base unit with a first one of the plurality of cordless handset units over one of the plurality of communication channels; and
inserting a signal in said one of the communication channels occupied by the public base unit while said public base unit is communicating with said first one of the plurality of cordless handset units for providing to other of the plurality of cordless handset units identifying information for detection by said other of the plurality of cordless handset units while searching for an available communication channel, said identifying information being indicative of a public base unit communicating over said one of the communication channels.

24. The method of operating with a cordless telephone public base unit as in claim 23 wherein the identifying information comprises spectrum energy for modulating a carrier for the communication channel.

25. The method of operating with a cordless telephone public base unit as in claim 24 wherein the spectrum energy comprises a pilot signal located outside of an audible frequency portion of the communication channel.

26. The method of operating with a cordless telephone public base unit as in claim 24 wherein the spectrum energy comprises a frequency shift keying (FSK) signal located outside of an audible portion of the communication channel.

27. The method of operating with a cordless telephone public base unit as in claim 26 wherein the FSK signal identifies said public base unit associated with a particular available service.

28. A method of operating for a cordless telephone handset unit in a public cordless telephone system, the telephone system including at least one public base unit connectable to a telephone line for communicating with a central office and to the handset unit over a plurality of communication channels, and wherein the communication channels are occupyable by both the public base unit and a non-public base unit, the method comprising the steps of:
receiving in the handset unit a signal on at least one of the plurality of communication channels; and
detecting in the handset unit the presence of base-unit-type identifying information in the signal while searching for an available communication channel, the identifying information detected in each communication channel being indicative of a public base unit communicating thereon with another handset unit.

29. The method of operating for a cordless telephone handset unit as in claim 28 wherein the detecting step further comprises the step of interrogating each one of the plurality of communication channels for the identifying information.

30. The method of operating for a cordless telephone handset unit as in claim 29 further comprising the step of generating a first distinctive alerting signal in the handset unit responsive to the detecting step detecting the presence of the identifying information on a communication channel, the alerting signal being indicative of a public base unit occupying the communication channel.

31. The method of operating for a cordless telephone handset unit as in claim 30 wherein the alerting step generates a second distinctive alerting signal in the handset unit representative of the total number of public base units occupying the communication channels.

32. The method of operating for a cordless telephone handset unit as in claim 31 wherein the communication channels are occupiable by both said public base units and non-public base units, and wherein the alerting step generates a third distinctive alerting signal in the handset unit when all of the communication channels are occupied by any combination of these said public base units and a fourth distinctive alerting signal in the handset unit when at least one of the communication channels is available.

33. The method of operating for a cordless telephone handset unit as in claim 29 wherein the identifying information comprises spectrum energy inserted into the communication channel by the public base unit.

34. The method of operating for a cordless telephone handset unit as in claim 33 wherein the spectrum energy comprises a pilot signal located outside of an audible portion of the communication channel.

35. The method of operating for a cordless telephone handset unit as in claim 33 wherein the spectrum energy comprises a frequency shift keying (FSK) signal located outside of an audible portion of the communication channel.

36. A method of operating for a cordless telephone handset unit in a public cordless telephone system, the telephone system including at least one public base unit connectable to a telephone line for communicating with a central office and for transmitting signals to and receiving signals from the handset unit over a plurality of communication channels occupiable by both the public base unit and a non-public base unit, the method comprising the steps of:
interrogating the plurality of communication channels for identifying an available channel from among the communication channels and for identifying the presence of a public base unit operating on at least one of any occupied ones of these communication channels;
generating a service request signal on each identified available channel for establishing communications with said public base unit; and
inhibiting the service request signal generating step after the generation of a predetermined number of service request signals, the interrogating step, responsive to the inhibiting step, interrogating the remainder of the plurality of communication channels only for identifying said public base units operating on the occupied ones of these communication channels.

37. The method of operating for a cordless telephone handset unit as in claim 36 further comprising the step of generating a distinctive alerting signal in the handset unit indicative of the number of public base units that are occupying the plurality of communication channels.

38. The method of operating for a cordless telephone handset unit as in claim 36 further comprising the step of detecting in the handset unit identifying information included on each one of the channels occupied by the public base units.

39. The method of operating for a cordless telephone handset unit as in claim 38 wherein the identifying information comprises spectrum energy for modulating a carrier for each communication channel.

40. The method of operating for a cordless telephone handset unit as in claim 39 wherein the spectrum energy comprises a pilot signal located outside of an audible frequency portion of the communication channel.

41. The method of operating for a cordless telephone handset unit as in claim 39 wherein the spectrum energy comprises a frequency shift keying (FSK) signal located outside of an audible portion of the communication channel.

42. The method of operating for a cordless telephone handset unit as in claim 41 wherein the FSK signal provides means for identifying a public base unit associated with a particular available service.

* * * * *